Patented July 20, 1926.

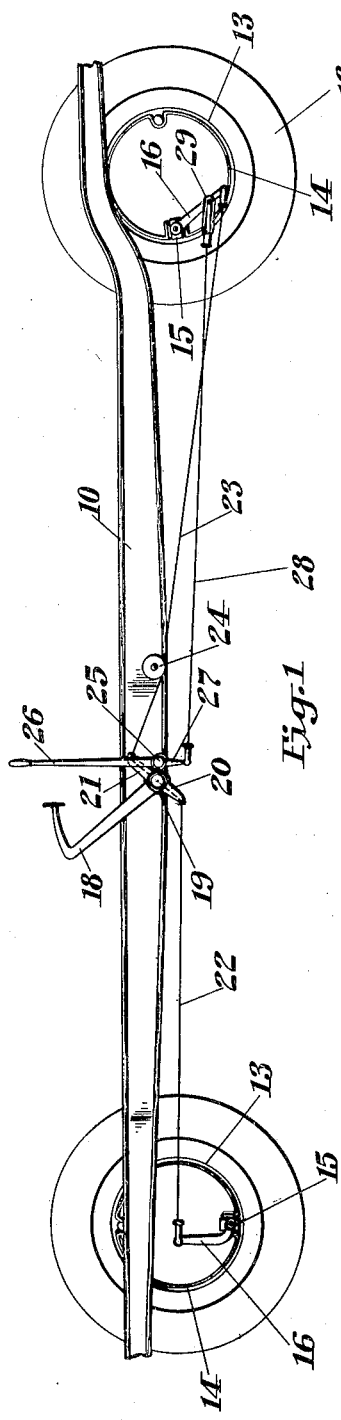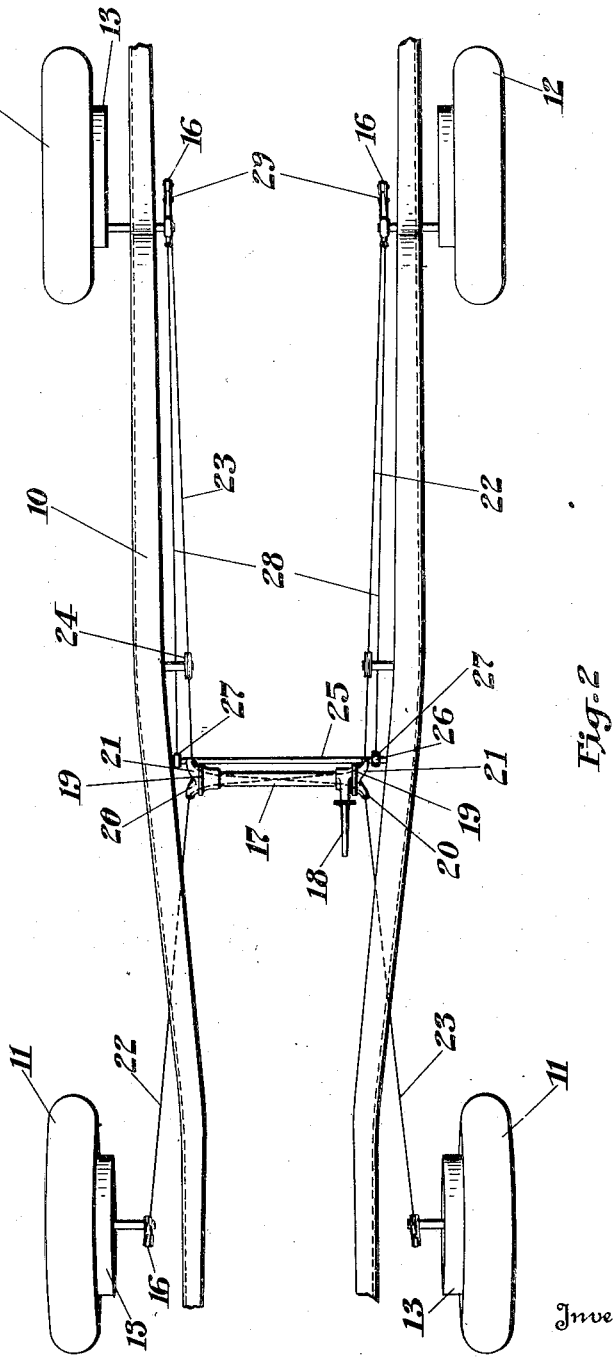

1,593,278

UNITED STATES PATENT OFFICE.

MILTON TIBBETTS, OF DETROIT, MICHIGAN, ASSIGNOR TO PACKARD MOTOR CAR COMPANY, OF DETROIT, MICHIGAN, A CORPORATION OF MICHIGAN.

MOTOR VEHICLE.

Application filed May 7, 1923. Serial No. 637,121.

This invention relates to motor vehicles and particularly to the brake applying mechanism thereof.

In connection with the braking of motor vehicles it is desirable that the mechanism should be as simple as possible in order to be free from trouble, that it should be positive in order that the vehicle may be well controlled, and that enough of the parts should be in duplicate in order that failure of one part may not cripple the entire system. It is also desirable that if possible there should be two kinds of braking action so that the operator may adapt his brake application to the kind of road or road surface over which he is driving or to the character of stop he desires to make.

One of the objects of the present invention is to provide a novel and simple brake mechanism which will embody the above desirable features.

Another object of the invention is that two differently acting brake applications shall be provided for whereby, for instance, the operator may apply all four brakes of the vehicle and thus slide the wheels in a straight line or he may apply only the rear wheel brakes and skid the rear end of the vehicle by turning the steering gear at the same time. Such emergency braking as the latter is sometimes necessary to avoid a collision with a crossing vehicle or to lessen the impact.

Another object of the invention is a mechanism that will insure two types of brake application being provided even though part of the service brake mechanism, or that brake mechanism which is used most of the time, is suddenly rendered inoperative or useless, whereby for instance, the operator may apply equalized right front and left rear brakes or both rear brakes in case the cable connecting the left front and right rear brakes is broken.

Other objects of the invention will appear from the following description taken in connection with the drawings, which form a part of this specification, and in which:

Fig. 1 is a side elevation, somewhat diagrammatic, of a motor vehicle embodying the invention; and Fig. 2 is a plan view of the invention shown in Fig. 1.

Referring to the drawings, 10 represents the frame of a motor vehicle, 11 the front wheels thereof, and 12 the rear wheels. Upon each of these wheels is a brake drum 13 and a brake 14 operated by a cam 15 and a lever 16. This brake construction may be of any desired or usual form.

Suitably mounted upon the frame of the vehicle is a rock shaft 17 operated by a foot lever 18 which is adapted to apply all four of the brakes on the front and rear wheels. The rock shaft 17 has a two-armed bracket 19 at each end, one of the arms 20 extending downwardly and the other arm 21 extending in the opposite direction or upwardly. These arms will rock with the shaft as the latter is oscillated by the foot lever 18.

Each of the front wheel brakes is adapted to be operated in equalization with the rear wheel brake on the opposite side of the vehicle. Thus the right front wheel brake arm 16 is connected by a cable 22 with the rear brake arm 16 on the left side of the vehicle, this cable 22 passing over the end of the arm 20 on the right side, through the rock shaft 17, as shown in dotted lines in Fig. 2, and over the end of the arm 21 at the left side of the vehicle. Also, the left front brake arm 16 is connected by a cable 23 with the right rear brake arm 16, this cable passing over the end of the arm 20 on the left side of the vehicle, through the rock shaft 17, and over the end of the arm 21 on the right side of the vehicle. Pulleys 24 may be provided if desired to guide the rear parts of the cables.

From the above it will be seen that when the rock shaft 17 is oscillated by the foot lever 18 both cables 22 and 23 are tightened and the brake arms 16 are moved to rock the cams 15 to apply all four brakes and, of course, the right front and left rear brakes will be equalized as will also the left front and right rear brakes. By this means of brake application the four wheels of the vehicle are retarded simultaneously and the vehicle will be caused to slide forwardly in a straight line. Also, if one of the cables breaks the remaining cable will apply one front brake and the rear brake on the opposite side of the vehicle thus providing diagonal braking of at least two brakes.

Mounted upon the vehicle frame 10 is a rock shaft 25 operated by a hand lever 26 and there are two arms 27 extending downwardly from the rock shaft and connected by rods 28 through pin-and-slot connections 29 with the brake operating arms 16 at the rear of the vehicle. Thus the brake lever 26 may be used to apply the rear wheel brakes only and its connection to those brake operating arms is entirely independent of the other brake operating connections. In the operation of this hand brake mechanism the cables 22 and 23 will merely slacken and in the operation of the foot brake mechanism the hand brake mechanism will remain stationary by reason of the pin-and-slot connection 29, shown particularly in Fig. 1.

From the above description it will be seen that either the four brakes may be applied simultaneously with diagonal equalization or in case of failure of that mechanism or part of it, or for the purpose of sliding the rear wheels only, the rear wheel brakes may be applied by the hand brake lever 26.

While I have herein described in some detail a specific embodiment of my invention, which I deem to be new and advantageous and may specifically claim, I do not desire it to be understood that my invention is limited to the exact details of the construction, as it will be apparent that changes may be made therein without departing from the spirit or scope of my invention.

Having thus described my invention, what I claim and desire to secure by Letters Patent is:

1. In a motor vehicle, the combination with brakes on front and rear wheels, of means for applying all said brakes simultaneously with equalization effected between each front wheel and the rear wheel on the opposite side of the vehicle, and independent means for applying the brakes at one end of the vehicle only.

2. In a motor vehicle, the combination with brakes on front and rear wheels, of means for applying all said brakes simultaneously with equalization effected between each front wheel and the rear wheel on the opposite side of the vehicle, and independent means for applying the rear wheel brakes only.

3. In a motor vehicle, the combination with brakes on front and rear wheels, of means for applying all said brakes simultaneously with equalization effected between each front wheel and the rear wheel on the opposite side of the vehicle, a separate brake applying lever, and connections from said lever to the rear wheel brakes entirely independent of the first mentioned brake applying means.

4. In a motor vehicle, the combination with brakes on all four wheels of the vehicle, of a foot lever, connections therefrom for applying all four of said brakes with diagonal equalization, a hand lever, and connections therefrom to the rear wheel brakes only, said latter connections being independent of said former connections.

5. In a motor vehicle, the combination with brakes on all four wheels of the vehicle, of equalizing cables connecting the front wheel brakes with the rear wheel brakes on opposite sides, a lever for applying said brakes through said equalizing cables, a second lever, and connections from said second lever to the rear brakes only, said latter connections being separate from and independent of the equalizing cables.

6. In a motor vehicle, the combination with brakes on all four wheels of the vehicle, of a brake lever, connections therefrom for applying all four of said brakes with diagonal equalization, a second brake lever, and connections from said second brake lever to rear wheel brakes only, said latter connections being independent of said former connection and being unequalized.

In testimony whereof I affix my signature.

MILTON TIBBETTS.